United States Patent [19]
Zhang

[11] Patent Number: 6,143,265
[45] Date of Patent: Nov. 7, 2000

[54] CONVERSION OF METAL OXIDE TO METAL PHOSPHATE

[75] Inventor: Zongchao Zhang, Norwood, N.J.

[73] Assignee: Akzo Nobel NV, Arnhem, Netherlands

[21] Appl. No.: 09/192,672

[22] Filed: Nov. 16, 1998

[51] Int. Cl.[7] .............................. C01B 25/26; C01B 25/37
[52] U.S. Cl. ......................... 423/305; 423/308; 423/311; 502/208; 502/210; 502/211; 502/213
[58] Field of Search ..................................... 423/305, 308, 423/311; 502/208, 210, 211, 213

[56] References Cited

U.S. PATENT DOCUMENTS

| | | | |
|---|---|---|---|
| 3,415,619 | 12/1968 | Young | 423/305 |
| 4,962,228 | 10/1990 | Hellring | 423/305 |
| 4,971,778 | 11/1990 | Bettermann et al. | 423/311 |
| 5,200,187 | 4/1993 | Haushalter et al. | 423/308 |

*Primary Examiner*—Wayne Langel
*Attorney, Agent, or Firm*—Richard P. Fennelly

[57] ABSTRACT

A metal oxide is treated with an organophosphate, such as a trialkyl phosphate, to convert the oxide to the corresponding phosphate. The metal in the oxide can be a transition metal, such as iron, and the trialkyl phosphate preferably contains from one to about four carbon atoms in each alkyl group. The treatment can be conducted at an elevated temperature of about 250° C. or greater.

6 Claims, No Drawings

CONVERSION OF METAL OXIDE TO METAL PHOSPHATE

BACKGROUND OF THE INVENTION

Transition metal oxides, such as iron oxide and nickel oxide, are active catalysts for hydrocarbon oxidation. The oxidation products of such a reaction are typically carbon monoxide or carbon dioxide. However, transition metal phosphates, such as ferric phosphate or ferric pyrophosphate, are more selective catalysts for the alkaline oxidative dehydrogenation to olefins. A sol-gel precipitation method, in the liquid phase, is conventionally used to prepare such metal phosphate catalysts. Such a method cannot avoid also forming a certain amount of metal oxide product. Even the presence of a small amount of metal oxide in the desired phosphate catalyst product can be harmful to the selectivity of such a catalyst to the desired olefin product.

In related copending U.S. Ser. No. 192,673, entitled "Oxidative Dehydrogenation of Alkane to Alkene Using a Transition Metal Phosphate Catalyst", filed on even date herewith, abandoned, the catalytic oxidative dehydrogenation of the alkane compound, such as ethane, to the alkene compound, such as ethylene, is carried out using a transition metal phosphate catalyst. The process of this invention is deemed to be one process in which such catalyst materials might be synthesized from the corresponding oxide. In addition, the present process can be used as a convenient way of converting undesired metal oxide materials in conventional transition metal phosphate catalysts to the more desirable phosphate analogue(s). In this manner, the performance of the resulting catalyst composition can be improved (for example, in regard to the selectivity of the catalyst to the desired product of the reaction).

SUMMARY OF THE INVENTION

The present invention relates to the treatment of a metal oxide with an organophosphate, such as a trialkyl phosphate, to convert the oxide to the corresponding phosphate.

DESCRIPTION OF THE PREFERRED EMBODIMENTS

The metal oxide or metal oxide-containing material intended to be treated in accordance with this invention is a transition metal oxide with the transition metal preferably being selected from Groups 3–12 of the Period Table of the Elements (from Chemical and Engineering News, 63(5), 27, 1985), preferably Groups 8–12. Representative metal species include iron (Group 8), nickel (Group 10), molybdenum (Group 6) and zinc (Group 12). The metal oxide can contain more than one of these species and may be in either bulk form or supported form. The catalyst composition may also contain other metal species that are not transition metals, such as aluminum as would be present in $FeAl(PO_4)_2$. The metal oxide material can be loaded into a fixed bed reactor or other suitable container for the reaction.

The foregoing type of metal oxide material is then treated with an organophosphate reagent to convert it to the more desired, analogous phosphate composition. The organophosphate reagent is preferably volatile so that the reaction proceeds in the gas phase and most preferably is a trialkylphosphate containing from one to about twenty carbon atoms in each alkyl group, preferably from one to about four carbon atoms. The treatment is advantageously performed at elevated temperature, for example, at a temperature of about 250° C. or greater (e.g., 500° C. or greater).

The specific embodiment of the present invention that are described hereinabove should not be used to restrict the scope of the present invention since they are set forth merely to exemplify certain embodiments of the present invention.

I claim:

1. A process which comprises the treatment of a metal oxide with an organophosphate to convert the oxide to the corresponding phosphate wherein the treatment is carried out at a temperature of about 250°C. or greater.

2. A process as claimed in claim 1 wherein the metal is a transition metal.

3. A process as claimed in claim 1 wherein the metal is iron.

4. A process as claimed in claim 1 wherein the metal is a transition metal and the organophosphate is a trialkylphosphate containing from one to about four carbon atoms in each alkyl group.

5. A process which comprises the treatment of an iron oxide with an organophosphate to convert the oxide to the corresponding phosphate wherein the treatment is carried out at a temperature of about 250°C. or greater.

6. A process which comprises the treatment of an iron oxide with a trialkylposphate containing from one to about four carbon atoms in each alkyl group to convert the oxide to the corresponding phosphate, wherein the treatment is carried out at a temperature of about 250°C. or greater.

* * * * *